Reginald P. Fraser,
George T. Furman ated May 25, 1965

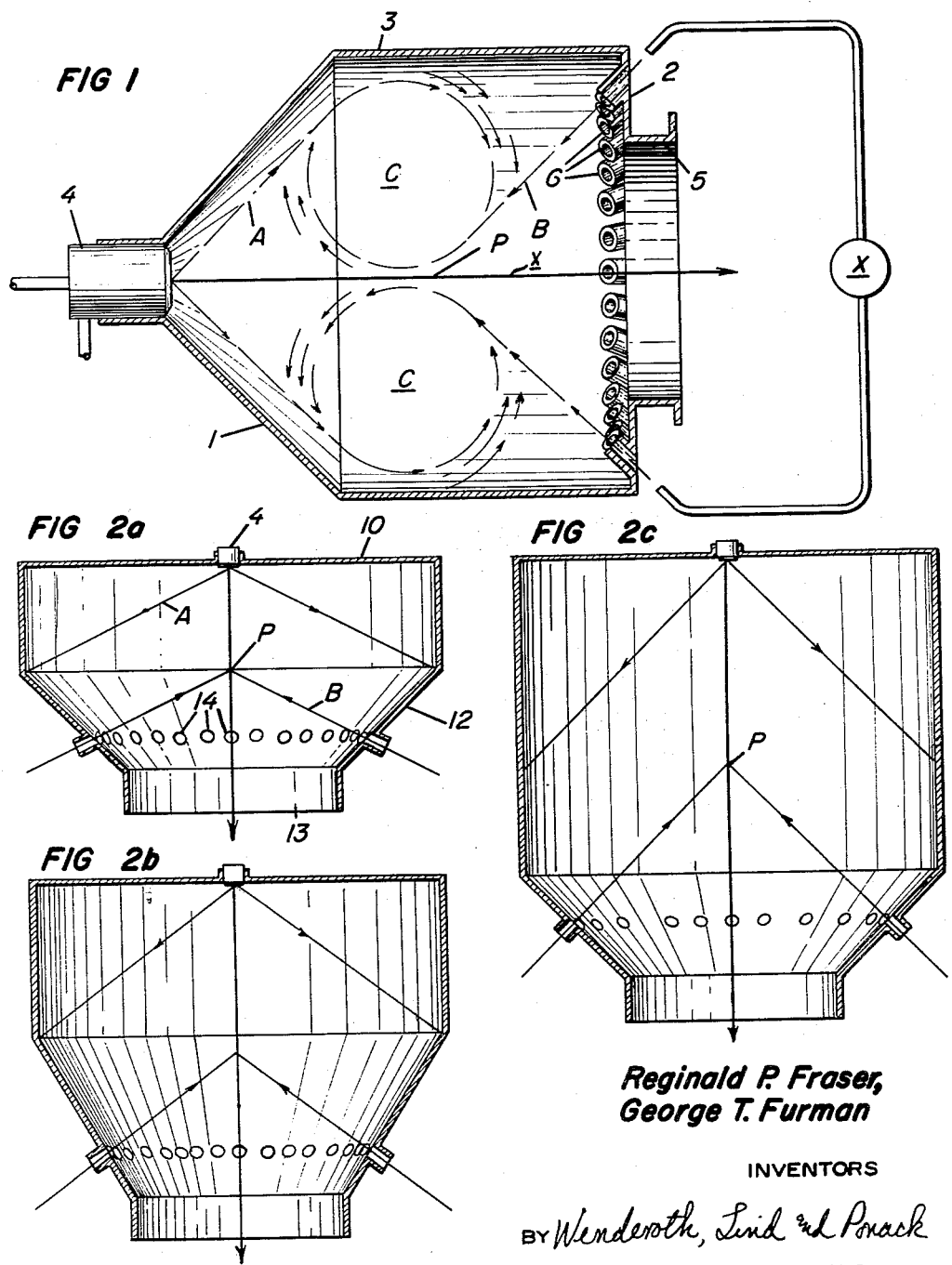
Reginald P. Fraser,
George T. Furman
INVENTORS

3,185,448
APPARATUS FOR MIXING FLUIDS
Reginald Percy Fraser, Surrey, and George Thomas
Furman, Middlesex, England, assignors to Urquhart's
(1926) Limited, Greenford, England, a British company
Filed June 3, 1963, Ser. No. 285,144
Claims priority, application Great Britain, June 25, 1959,
38,669/59
8 Claims. (Cl. 259—4)

This application is a continuation-in-part of our application Serial No. 38,669, filed on June 24, 1960, now abandoned.

This invention relates to an apparatus for mixing fluids, and particularly to an apparatus for the mixing of combustible gases or fluids, such as atomised or vaporized hydrocarbon fuels with a gaseous supporter of combustion, such as air or oxygen.

The chief object of the present invention is to provide an improved apparatus for mixing of fluids in a dynamic pattern of fluid flow which is self imposed and which insures thorough mixing and prolonged "residence time" in the apparatus by travel within the apparatus over a long distance but within a well confined space bounded by the walls of a mixing chamber of compact form and simple construction. When the apparatus is used for mixing of components of combustible nature, and the components are burned during the mixing, the chamber is, in addition to a mixing chamber, a combustion chamber.

Another object of the present invention is to provide an apparatus for mixing fluids in which the fluids to be mixed are fed under pressure into a mixing chamber, a portion of the fluids to be mixed being fed into the chamber through a first fluid pressure means mounted in the front wall of the chamber in a substantially conical divergent stream, and the remainder of the fluids being fed through an annular inlet means around the exit duct from the chamber in a conical pattern which converges on the axis of the chamber within the divergent stream, so that the two streams intermingle and set up a toroidal vortex within the diverging stream, the toroidal vortex extending transversely of the chamber. The two streams join the toroidal vortex in substantially tangential directions, and continued feeding of the two streams thoroughly mixes the fluids and forces the mixture out through the exit duct of the chamber.

When the divergent stream is a fuel and the convergent stream is a gaseous supporter of combustion, a well mixed combustible mixture is formed, part or all of which may be burnt within the chamber and as it emerges from the exit duct in the rear wall of the chamber, or the mixture may be burnt only when it emerges through the exit duct.

The mixing chamber of the apparatus according to the invention can be of simple symmetrical shape, such as cylindrical or may be in the shape of a pair of opposed cones, or a combination of these shapes. In a preferred embodiment, the chamber has a front wall which has a central aperture therein, and in alternative embodiments, the front wall can also have an annular inlet means around the periphery of the front wall and a further annular inlet means intermediate the central aperture and the peripheral annular inlet means. The chamber also has a peripheral wall, which either has the part thereof most remote from the front wall converging to a central exit duct coaxial with the central aperture in the front wall or has the entire peripheral wall converging, for example in the shape of a cone, to the exit duct. The chamber can have a length to diameter ratio of from 0.5 to 5.0. In the peripheral wall is provided an annular inlet means which is angled inwardly along lines which converge at a point on the axis between the central aperture in the front wall and the central exit duct. This point can be from ¼ to ¾ the distance along this axis from the central aperture to the exit duct. In the central aperture in the front wall is a fluid pressure means which delivers fluid under pressure to the interior of the chamber in a conical divergent stream which strikes the peripheral wall of the chamber at a point which is from ¼ to ¾ the distance along the axis from the central aperture to the exit duct.

With a chamber of this type, when from 40–60% of the mass of the fluids to be mixed is delivered through the fluid pressure means at a velocity of at least 10 ft./sec. for smaller chambers and up to 1000 ft./sec. for larger chambers, and velocities intermediate of the velocities for chambers of intermediate size, and the remainder of the fluids are delivered in the conically convergent stream at like velocities, the relationships of the streams will cause the formation of the toroidal vortex within the divergent stream, and continued feeding of the fluids in the same mass ratio and at the same velocities will maintain the vortex in a stable condition, thereby insuring the thorough mixing of the fluids during their relatively prolonged residence time in the chamber.

The invention will now be described in greater detail, with reference to the accompanying drawings, in which:

FIG. 1 is a diagrammatic representation of an apparatus according to the invention with a diagrammatic representation of the flow pattern of the fluids being fed into the chamber;

FIGS. 2a–2c are diagrammatic representations of chambers of the apparatus in which the front wall is perpendicular to the axis of the chamber and only the portion of the peripheral wall remote from the front wall is convergent to the exit duct, and in which the length to diameter ratio varies from 0.5 to 1.0;

Figure 2E:
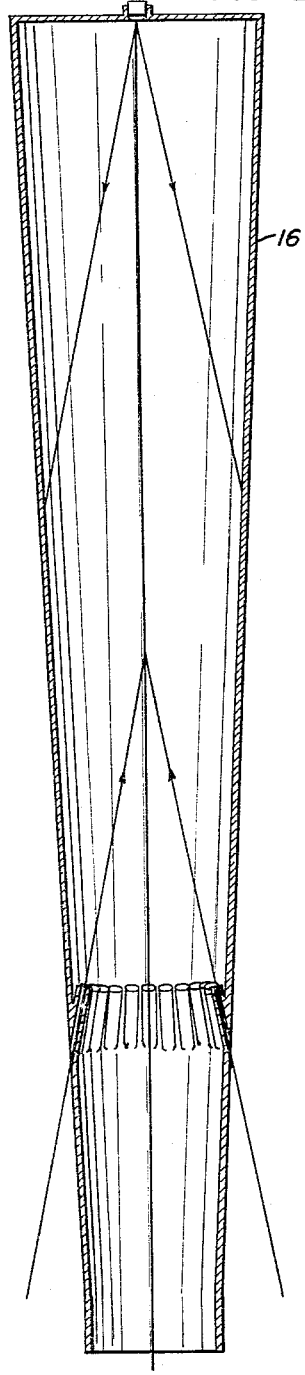
FIGS. 2d and 2e are diagrammatic representations of chambers of the apparatus in which the front wall is perpendicular to the axis of the chamber and the peripheral wall is convergent toward the exit duct along its entire length, and in which the length to diameter ratio is 2.0 and 5.0 respectively.

Referring first to FIG. 1, the apparatus consists essentially of a mixing chamber having a conical front wall 1 with a central aperture therein in which is mounted a fluid pressure means 4. The chamber has a peripheral wall 3 which has a portion 2 most remote from the front wall 1 which converges radially inwardly to a central exit duct 5 which is coaxial with the central aperture in the front wall. Inlet means is provided in said converging peripheral wall portion 5 which in the embodiment shown is in the form of a plurality of inlet ducts 6 which are closely spaced. By "closely spaced" is meant as close as structural considerations will permit. Ideally the inlet means should be an annular aperture, as will be described more fully hereinafter, but in larger structures, strength considerations make the use of an annular aperture highly impractical, so that closely spaced ducts are as close an approximation as can be obtained.

The inlet ducts 6 are angled inwardly along lines which coverge at a point $p$ on the axis $x$ between the central aperture in the front wall 1 and the central exit duct 5. The point $p$ is from ¼ to ¾ the distance along the axis $x$ from the central aperture to the central exit duct 5. Connected to the inlet means is a source X of fluid under pressure.

The fluid pressure means 4 in the central aperture of the front wall 1 is adapted to deliver a substantially conical divergent non-vortical stream of fluid A into the chamber at a cone angle such that the stream would, if it were left to flow unhindered, strike the peripheral wall 3 at a point which is from ¼ to ¾ the distance along the axis from the central aperture in the front wall 1 to the central exit duct 5. The fluid pressure means 4 can be a divergent annulus, or a group of divergent orifices, or a conventional pressure atomizer or a two fluid atomizer which produces a conical stream of mixed gas and liquid.

In operation, from 40–60% of the mass of the fluids to be mixed is fed into the chamber through the fluid pressure means 4 at a velocity of from 10 to 1000 ft./sec., depending on the size of the chamber, as the conical divergent non-vortical stream A, which in the embodiment of FIG. 1 has a conicity corresponding to the conicity of the front wall 1, and the remainder of the mass of fluids to be mixed is fed into the chamber at substantially the same velocity through the inlet ducts 6 in the converging non-vortical stream B, and the streams A and B intermingle to form a toroidal vortex C.

In the embodiment shown in FIG. 1, the two streams A and B are shown as having substantially the same conicity, and the width of the space between them is nearly equal to the radius of the chamber, so that the toroidal vortex C formed by the intermingling of the fluids occupies nearly the whole of the transverse area of the chamber. The arrows indicate approximately the kind of dynamic flow that takes place. The fluids can circulate several times within the vortex at every cross section thereof. Since the convergent stream B converges within the divergent stream A, the toroidal vortex C lies wholly within the boundary of the divergent stream A.

It will be readily appreciated that if both conical streams A and B have the same cone angle, the space between them is a frusto-conical annulus of uniform thickness or width, and that if the conicities differ, the width of the annulus between the streams progressively changes along the annulus and the cross sectional shape of the toroidal vortex taken in a plane through the axis $x$ will be distorted somewhat.

The width of the annular space between the streams A and B determines the size of the toroidal vortex C formed between them, and the width of the annular space is determined partly by the size and the length to diameter ratio of the chamber and partly by the angles of conicity of the streams. Preferably these factors are chosen so that the toroidal vortex C occupies a substantial part of both the length and diameter of the chamber, as shown.

The practical limit, from the geometrical standpoint, to the size and shape of the chamber is, as has been pointed out above, a length to diameter ratio of 0.5 to 5.0. The length factor in the ratio is the length along the axis $x$ from the central aperture in the front wall 1 to the central exit duct 5, and the diameter factor is the maximum diameter of the peripheral wall. FIGS. 2a–2e illustrate the range of length to diameter ratios for chambers according to the present invention. In practice, actual diameters may range from 1″ to 120″, but the invention is not limited to this range.

As seen in FIGS. 2a–2c, the chamber has a front wall 10 which is substantially perpendicular to the axis $x$ and has a central aperture with the fluid pressure means 4 therein. A peripheral wall 11 is cylindrical for part of the length of the chamber and has the portion 12 thereof most remote from the front wall 10 converging at an angle to the axis $x$ to the exit duct 13. Inlet means is provided in the portion 12 of the peripheral wall in the form of an annular inlet duct 14 which is angled inwardly along lines which converge about half way along the axial length of the chamber. In FIG. 2a, the length to diameter ratio is 0.5, i.e. the diameter is twice the length of the chamber, while in FIG. 2b the ratio is .75, and in FIG. 2c the ratio is 1.0.

Figure 2D:
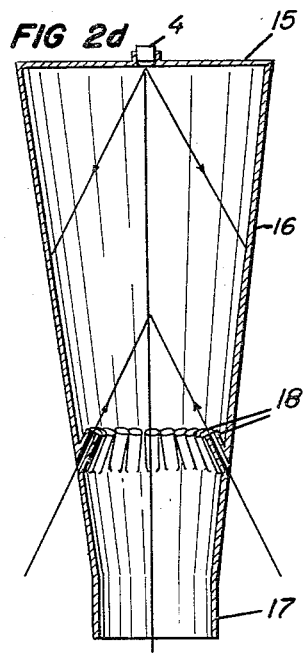

As seen in FIGS. 2d and 2e, the chamber has a front wall 15 which is substantially perpendicular to the axis $x$ and has a central aperture with the fluid pressure means 4 therein. A peripheral wall 16 is conical for the entire length thereof and converges at an angle to the axis $x$ to the exit duct 17. Inlet means is provided in the portion of the peripheral wall most remote from the front wall 15 in the form of inlet ducts 18 which are angled inwardly along lines which converge at point $p$ about half way along the axial length of the chamber. In FIG. 2d, the length to diameter ratio is 2.0, while in FIG. 2e the ratio is 5.0.

Figure 3:
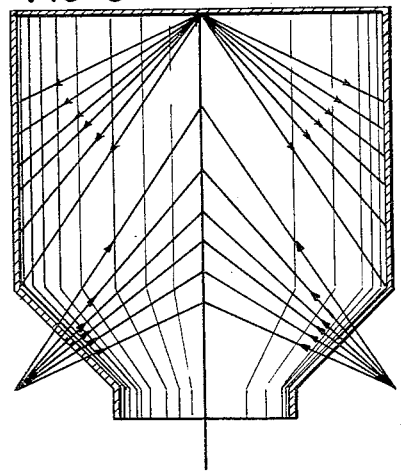
FIG. 3 is a diagrammatic representation of a chamber of the apparatus showing a range of conical flow patterns which are permissible for the fluids being fed into the chamber.

The practical limit, from a geometrical standpoint, to the conicity of the streams is shown in FIG. 3. For the divergent stream, the stream will, if it flows unhindered, strike the peripheral wall at a point which is from ¼ to ¾ the distance along the axis $x$ from the central aperture in the front wall to the central exit duct. For the convergent stream, the stream will, if it flows unhindered, converge at a point $p$ on the axis which is from ¼ to ¾ the distance along the axis from the central aperture in the front wall to the exit duct.

The diameter of the central exit duct will vary with the diameter of the chamber. If it is desired that chambers of progressively increasing diameter should have an approximately uniform exit velocity, the diameter of the exit duct increases with the diameter of the chamber not, however, in a simple proportion, but rather at a progressively increasing rate. Thus, ultimately, the exit duct diameter may become equal to the diameter of the chamber. As the diameter of the exit duct increases disproportionately, the conicity of the stream B changes.

In addition to the two streams A and B being fed into the chamber as described above, one or more additional non-vortical streams can be fed into the chamber in directions substantially tangential to and/or confluent with the toroidal vortex C, the additional stream or streams traveling close to the chamber walls so as to effect so-called film cooling thereof. For instance, one such additional stream may flow close to the surface of the peripheral wall of the chamber. An embodiment of the mixing chamber with means for producing such a stream is shown in FIG. 4.

Figure 4:
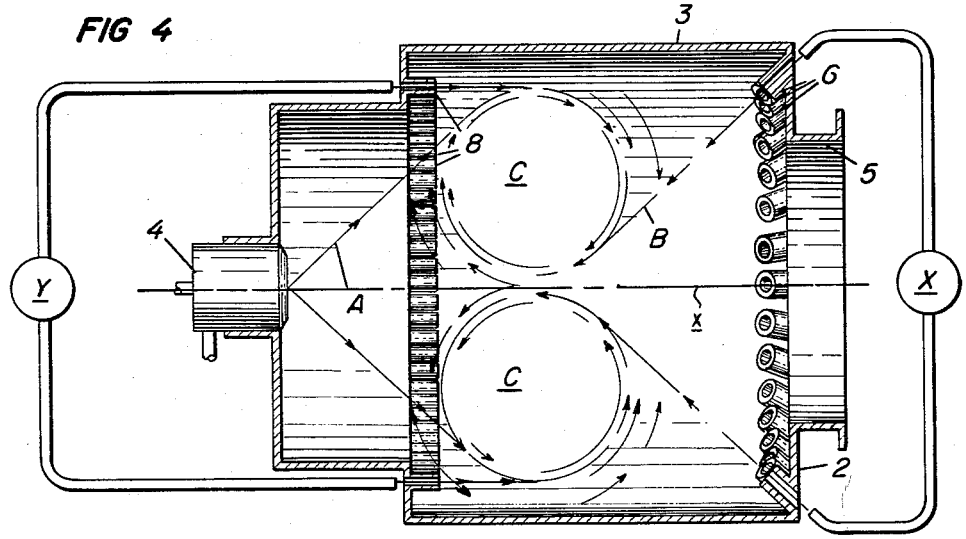
FIG. 4 is a view similar to FIG. 1 of a slightly modified form of apparatus according to the invention in which additional inlet means are provided in the front wall of the chamber.

The embodiment of FIG. 4 is substantially the same as that of FIG. 1 except that in addition to the central aperture in the front wall 1 there is provided an annular inlet means around the periphery of the front wall 1, the annular inlet means being a plurality of closely spaced inlet ducts 8 directed parallel to the axis $x$ so as to form a non-vortical annular stream of fluid along the inside surface of the peripheral wall 3. The fluid is applied to the inlet ducts 8 from a source of pressure Y. As seen from the arrows depicting an approximation of the flow pattern of the fluid streams, the annular flow is tangential to the torodial vortex C and the stream is entrained in the vortex and the fluid thereof becomes mixed with the fluid in the vortex. For purposes of determining the proportionate amount of fluid to be introduced through the annular inlet ducts 8, it should be a relatively minor portion of the total mass of fluid fed into the chamber and should be considered as forming part of the mass of fuel delivered through the fluid pressure means when comparing the mass of fluid delivered in the divergent stream to the mass of fluid delivered in the convergent stream.

Figure 5:
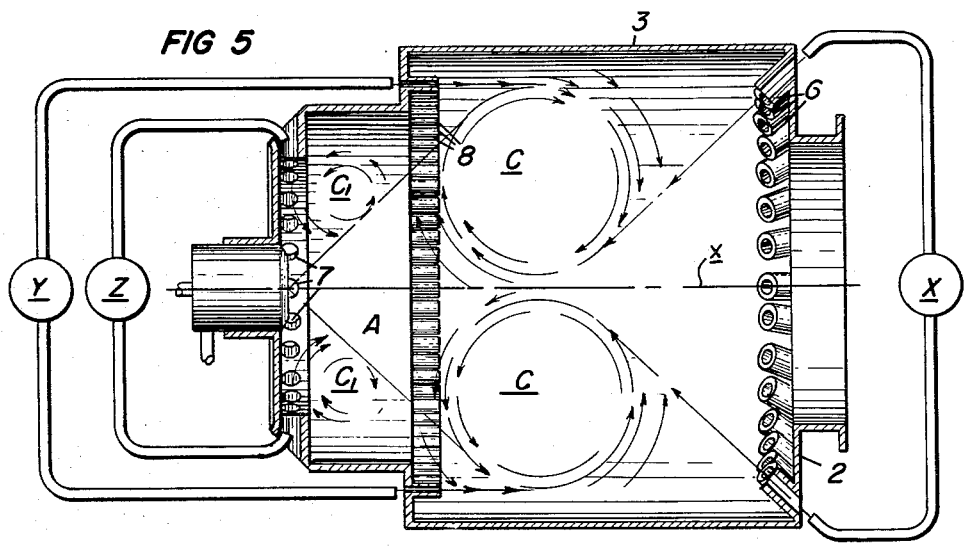
FIG. 5 is a view similar to FIG. 1 of a further modification of the apparatus in which two additional inlet means have been provided in the front wall of the chamber.

In a further embodiment of the apparatus according to the invention, an additional stream of fluid is fed into the chamber close to the front wall of the chamber. This embodiment is illustrated in FIG. 5, which shows a chamber substantially the same as the chamber of FIG. 1 except that there has been added to it the inlet means at the periphery of the front wall, as shown in FIG. 4, and a second annular inlet means in the form of a plurality of inlet ducts 7 in the front wall 1 which are intermediate the central aperture in the front wall and the annular inlet ducts 8 around the periphery of the front wall. The second annular inlet means are directed radially inwardly of the chamber along a radially extending portion of the front wall 1, and the fluid fed into the chamber through them is supplied from a source of pressure fluid Z. The fluid fed through the inlet means 7 is directed so that it becomes confluent with the divergent stream A and forms a secondary torodial vortex $C_1$ by entraining a small portion of the fluid from the divergent stream A. This secondary vortex is useful in maintaining ignition of a flame where the fluids are a fuel and a gaseous supporter of fuel, as well as being a coolant for the front wall of the chamber.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

We claim:

1. Apparatus for mixing fluids, consisting essentially of a chamber having a front wall having only a central aperture therein, said chamber having a central exit duct coaxial with said front wall central aperture and further having a peripheral wall with at least the portion of said peripheral wall most remote from said front wall converging to said central exit duct, said chamber having a length to diameter ratio of from 0.5 to 5.0, inlet means in said peripheral wall in a single annular ring around said exit duct, said inlet means being angled inwardly along lines which converge at a point on an axis between said central aperture in the front wall and said central exit duct which is from ¼ to ¾ the distance along said axis from said central aperture to said exit duct, first fluid pressure means mounted in said front wall central aperture for delivering from 40–60% of the mass of the fluids to be mixed into said chamber as a substantially conical divergent stream having a velocity of at least 10 ft./sec. which strikes the peripheral wall at a point which is from ¼ to ¾ the distance along the axis from the said central aperture to the exit duct, whereby when the fluids to be mixed are delivered into said chamber through said first fluid pressure means and through said inlet means, they are delivered in substantially conical patterns with the fluid in one conical pattern traveling in the opposite direction from the fluid in the other conical pattern, and all of the contents of the fluid streams intermingle to form a large torodial vortex within said chamber which lies wholly within the boundary of the divergent stream.

2. Apparatus as claimed in claim 1 in which the portion of said peripheral wall most remote from said front wall converges radially to said exit duct, and said inlet means comprise a plurality of closely spaced inlet ducts in an annular ring around said radially inwardly extending wall portion.

3. Apparatus as claimed in claim 1 in which the portion of said peripheral wall most remote from said front wall converges at an angle to said axis.

4. Apparatus as claimed in claim 1 in which said all of the peripheral wall converges at an angle to said axis.

5. Apparatus as claimed in claim 1 in which said inlet means comprise a plurality of closely spaced inlet ducts in an annular ring around said portion of said peripheral wall most remote from said front wall.

6. Apparatus as claimed in claim 1 in which said inlet means comprises two wall parts spaced in the direction of said axis of said chamber and defining between them an annular aperture opening into said chamber.

7. Apparatus for mixing fluids, consisting essentially of a chamber having a front wall having only a central aperture and an annular inlet means around the periphery of the front wall, said annular inlet means being directed parallel to the axis of said central aperture, said chamber further having a central exit duct coaxial with said front wall central aperture and further having a peripheral wall with at least the portion of said peripheral wall most remote from said front wall converging to said central exit duct, said chamber having a length to diameter ratio of from 0.5 to 5.0, inlet means in said peripheral wall in a single annular ring around said exit duct, said inlet means being angled inwardly along lines which converge at a point on the axis between said central aperture in the front wall and said central exit duct which is from ¼ to ¾ the distance along said axis from said central aperture to said exit duct, first fluid pressure means mounted in said front wall central aperture for delivering part of the fluids to be mixed into said chamber as a substantially conical divergent stream having a velocity of at least 10 ft./sec. which strikes the peripheral wall at a point which is from ¼ to ¾ the distance along said axis from the said central aperture to the exit duct, whereby when from 40–60% of the mass of the fluids to be mixed are delivered into said chamber through said first fluid pressure means and said inlet means in said front wall and the remainder of the fluids are delivered through said inlet means in the peripheral wall, the fluids delivered through said first fluid pressure means and said inlet means in the peripheral wall are delivered in substantially conical patterns with the fluid in one conical pattern traveling in the opposite direction from the fluid in the other conical pattern and all of the contents of the two fluid streams intermingle to form a large toroidal vortex within said chamber which lies wholly within the boundary of the divergent stream, and the fluid delivered through said inlet means in the front wall of the chamber is delivered in a cylindrical stream tangent to the outside periphery of the toroidal vortex.

8. Apparatus for mixing fluids, consisting essentially of a chamber having a front wall having only a central aperture and two annular inlet means, the first annular inlet means being directed parallel to the axis of said central aperture and the second annular inlet means being intermediate the central aperture and the first annular inlet means and being directed radially inwardly toward the axis of the central aperture along the portion of the front wall between the said second annular inlet means and the central aperture, said chamber further having a central exit duct coaxial with said front wall central aperture and further having a peripheral wall with at least the portion of said peripheral wall most remote from said front wall converging to said central exit duct, said chamber having a length to diameter ratio of from 0.5 to 5.0, inlet means in said peripheral wall in a single annular ring around said exit duct, said inlet means being angled inwardly along lines which converge at a point on the axis between said central aperture in the front wall and said central exit duct which is from ¼ to ¾ the distance along said axis from said central aperture to said exit duct, first fluid pressure means mounted in said front wall central aperture for delivering part of the fluids to be mixed into said chamber as a substantially conical divergent stream having a velocity of at least 10 ft./sec. which strikes the peripheral wall at a point which is from ¼ to ¾ the distance along said axis from the said central aperture to the exit duct, whereby when from 40–60% of the mass of the fluids to be delivered into said chamber through said first fluid pressure means and said inlet means in said front wall and the remainder of the fluids are delivered through said inlet means in the peripheral wall, the fluids delivered through said first fluid pressure means and said inlet means in the peripheral wall are delivered in substantially conical patterns with the fluid in one conical pattern traveling in the opposite direction from the fluid in the other conical pattern and all of the contents of the two fluid streams intermingle to form a large toroidal vortex within said chamber which lies wholly within the boundary of the divergent stream, and the fluid delivered through the first annular inlet means in the front wall of the chamber is delivered in a cylindrical stream tangent to the outside periphery of the toroidal vortex, and the fluid delivered through the second annular inlet means is delivered against the outside of the divergent stream and intermingles with the fluid of the divergent stream to form a smaller toroidal vortex around the outside of the divergent stream.

References Cited by the Examiner

UNITED STATES PATENTS 2,923,348   2/60   Fraser _____ 158—4

CHARLES A. WILLMUTH, *Primary Examiner.*